(12) United States Patent
Kreeger et al.

(10) Patent No.: US 7,706,600 B2
(45) Date of Patent: Apr. 27, 2010

(54) ENHANCED VIRTUAL NAVIGATION AND EXAMINATION

(75) Inventors: Kevin Kreeger, Sunnyvale, CA (US); Sarang Lakare, Selden, NY (US); Zhenrong Liang, Stony Brook, NY (US); Mark R. Wax, Greenlawn, NY (US); Ingmar Bitter, Rockville, MD (US); Frank Dachille, Amityville, NY (US); Dongqing Chen, Port Jefferson Station, NY (US); Arie E. Kaufman, Plainview, NY (US)

(73) Assignee: The Research Foundation of State University of New York, Stony Brook, NY (US)

( * ) Notice: Subject to any disclaimer, the term of this patent is extended or adjusted under 35 U.S.C. 154(b) by 1209 days.

(21) Appl. No.: 10/380,210

(22) PCT Filed: Oct. 2, 2001

(86) PCT No.: PCT/US01/30942

§ 371 (c)(1),
(2), (4) Date: Sep. 6, 2005

(87) PCT Pub. No.: WO02/29723

PCT Pub. Date: Apr. 11, 2002

(65) Prior Publication Data

US 2007/0003131 A1    Jan. 4, 2007

(51) Int. Cl.
G06K 9/00 (2006.01)
G06K 9/36 (2006.01)
A61B 5/05 (2006.01)
G06T 15/00 (2006.01)

(52) U.S. Cl. .................. 382/154; 382/128; 382/285; 600/425; 345/419

(58) Field of Classification Search ............... 382/128, 382/153, 154, 131, 285, 190, 132; 345/424, 345/419, 112, 421, 952, 959, 420, 423, 427, 345/473, 474; 600/407, 425; 351/243; 700/98; 128/920, 898; 434/262, 267, 272; 395/121, 395/124, 120, 161; 340/723; 364/413.13, 364/413.19, 413.22
See application file for complete search history.

(56) References Cited

U.S. PATENT DOCUMENTS 4,367,216 A    1/1983    Mutzel et al.

(Continued)

FOREIGN PATENT DOCUMENTS

WO    9613207    5/1996

(Continued)

OTHER PUBLICATIONS

Hong et al., "3D Virtual Colonscopy," 1995 Biomedical Visualization Proceedings, pp. 26-32 and 83 (1995).

(Continued)

*Primary Examiner*—Sheela C Chawan
(74) *Attorney, Agent, or Firm*—Dorsey & Whitney LLP

(57) ABSTRACT

Virtual navigation (2255) and examination of virtual objects are enhanced using methods of insuring that an entire surface to be examined has been properly viewed. A user interface (FIG. 23) identifies regions which have not been subject to examination and provides a mechanism (2250) to route the user to these regions in the 3D display. Virtual examination is further improved by the use of measuring disks (905) to enhance quantitative measurements such as diameter, distance, volume and angle. Yet another enhancement to the virtual examination of objects is a method of electronic segmentation, or cleaning, which corrects for partial volume effects occurring in an object.

9 Claims, 13 Drawing Sheets

U.S. PATENT DOCUMENTS

| | | | |
|---|---|---|---|
| 4,391,280 | A | 7/1983 | Miller |
| 4,630,203 | A | 12/1986 | Szirtes |
| 4,710,876 | A | 12/1987 | Cline et al. |
| 4,719,585 | A | 1/1988 | Cline et al. |
| 4,729,098 | A | 3/1988 | Cline et al. |
| 4,737,921 | A | 4/1988 | Goldwasser et al. |
| 4,751,643 | A | 6/1988 | Lorensen et al. |
| 4,791,567 | A | 12/1988 | Cline et al. |
| 4,823,129 | A | 4/1989 | Nelson |
| 4,831,528 | A | 5/1989 | Crawford et al. |
| 4,874,362 | A | 10/1989 | Wiest et al. |
| 4,879,668 | A | 11/1989 | Cline et al. |
| 4,984,157 | A | 1/1991 | Cline et al. |
| 4,985,834 | A | 1/1991 | Cline et al. |
| 4,985,856 | A | 1/1991 | Kaufman |
| 4,987,554 | A | 1/1991 | Kaufman |
| 4,993,415 | A | 2/1991 | Long |
| 5,006,109 | A | 4/1991 | Douglas et al. |
| 5,023,072 | A | 6/1991 | Cheng |
| 5,038,302 | A | 8/1991 | Kaufman |
| 5,047,772 | A | 9/1991 | Ribner |
| 5,056,020 | A | 10/1991 | Feldman et al. |
| 5,095,521 | A | 3/1992 | Trousset et al. |
| 5,101,475 | A | 3/1992 | Kaufman |
| 5,127,037 | A | 6/1992 | Bynum |
| 5,166,876 | A | 11/1992 | Cline et al. |
| 5,170,347 | A | 12/1992 | Tuy et al. |
| 5,187,658 | A | 2/1993 | Cline et al. |
| 5,204,625 | A | 4/1993 | Cline et al. |
| 5,229,935 | A | 7/1993 | Yamagishi et al. |
| 5,245,538 | A | 9/1993 | Lis |
| 5,261,404 | A | 11/1993 | Mick et al. |
| 5,265,012 | A | 11/1993 | Amans et al. |
| 5,270,926 | A | 12/1993 | Tam |
| 5,283,837 | A | 2/1994 | Wood |
| 5,295,488 | A | 3/1994 | Lloyd et al. |
| 5,299,288 | A | 3/1994 | Glassman et al. |
| 5,322,070 | A | 6/1994 | Goodman et al. |
| 5,345,490 | A | 9/1994 | Finnigan et al. |
| 5,361,763 | A | 11/1994 | Kao et al. |
| 5,365,927 | A | 11/1994 | Roemer et al. |
| 5,371,778 | A | 12/1994 | Yanof et al. |
| 5,442,733 | A | 8/1995 | Kaufman et al. |
| 5,458,111 | A | 10/1995 | Coin |
| 5,548,694 | A * | 8/1996 | Frisken Gibson ........... 345/424 |
| 5,611,025 | A | 3/1997 | Lorensen et al. |
| 5,623,586 | A | 4/1997 | Höhne |
| 5,630,034 | A | 5/1997 | Oikawa et al. |
| 5,699,799 | A | 12/1997 | Xu et al. |
| 5,734,384 | A | 3/1998 | Yanof et al. |
| 5,782,762 | A | 7/1998 | Vining |
| 5,971,767 | A * | 10/1999 | Kaufman et al. ............ 434/267 |
| 5,986,662 | A | 11/1999 | Argiro et al. |
| 6,083,162 | A * | 7/2000 | Vining ....................... 600/407 |
| 6,130,671 | A | 10/2000 | Argiro |
| 6,219,059 | B1 | 4/2001 | Argiro |
| 6,256,036 | B1 * | 7/2001 | Matsumoto ................. 345/419 |
| 6,272,366 | B1 | 8/2001 | Vining |
| 2001/0055016 | A1 | 12/2001 | Krishnan |
| 2002/0164061 | A1 | 11/2002 | Paik et al. |

FOREIGN PATENT DOCUMENTS

| | | |
|---|---|---|
| WO | 9811524 | 3/1998 |
| WO | 9837517 | 8/1998 |
| WO | 0055812 | 9/2000 |
| WO | 0055814 | 9/2000 |

OTHER PUBLICATIONS

Hong et al., "3D Reconstruction and Visualization of the Inner Surface of the Colon from Spiral CT Data," IEEE, pp. 1506-1510 (1997).

William E. Lorensen, "The Exploration of Cross-Sectional Data with a Virtual Endoscope," Interactive Technology and the New Health Paradigm, IOS Press, pp. 221-230 (1995).

Adam L. Penenberg, "From Stony Brook, a New Way to Examine Colons, Externally," The New York Times, p. 6 (1996).

David J. Vining, "Virtual Colonoscopy," Advance for Administrators in Radiology, pp. 50-52 (1998).

Zhou et al., "Three-Dimensional Skeleton and Centerline Generation Based on an Approximate Minimum Distance Field," The Visual Computer, 14:303-314 (1998).

Liang Z et al., "Inclusion of a priori information in segmentation of colon lumen for 3D virtual colonoscopy", 1997 IEEE Nuclear Science Symposium Conference Record, pp. 1423-1427, vol. 2.

Valev et al., "Techniques of CT colongraphy (virtual colonoscopy)", Critical Reviews in Biomedical Engineering, 1999, Begall House, vol. 27, No. 1-2, pp. 1-25.

Shibolet O et al., "Coloring voxel-based objects for virtual endoscopy", IEEE Symposium on Volume Visualization, Research Triangle, Oct. 1998.

Kaufman A., Wan M., "Disobstruction of Colon Wall Collapse", Project Description, online www.cs.sunysb.edu, Jan. 1999.

Holzapfel G A, et al., "Large strain analysis of soft biological membranes: formulation and finite element analysis", Computer Methods in Applied Mechanics and Engineering, vol. 132, No. 1-2, pp. 45-61, 1996.

Kaye J. et al., "A 3D virtual environment for modeling mechanical cardiopulmonary interactings", CVRMED-MRCAS '97, pp. 389-398, 1997.

Burgard W. et al., "Active mobile robot localization by entropy minimization", Proceedings second euromicro workshop on advanced mobile robots, pp. 155-162, 1997.

Suya You et al., "Interactive volume rendering for virtual colonoscopy", Proceedings Visualization '97, pp. 433-436, 571.

Pai D.K. et al., "Multiresolution Rough Terrain Motion Planning", IEEE Transactions on Robotics and Automatic, vol. 14, No. 1, pp. 19-33, 1998.

Hagen H. et al., "Methods for Surface Interrogation", Proceedings of the Conference on Visualitzation, vol. CONF 1, pp. 187-193, 1990.

Chen et al., "A tree-branch searching, multiresolution approach to skeletonization for virtual endoscopy".

Liang Z. et al., "Feasibility Studies on Extracting Bladder Wall from MR Images for Virtual Cystoscopy".

Chen et al., "Virtual Laryngoscopy: Feasibility Studies by CT and MRI", IEEE Medical Imaging Conference, Nov. 1999.

Chen et al., A multi-scan MRI-based virtual cystoscopy, Feb 2000.

Chen et al., "MRI-Based Virtual Cystoscopy: The image segmentation and visualization", SPIE Conference, Feb. 12-18, 2000.

Chen et al., "A Fast Algorithm to Generate Centerline for Virtual Colonscopy", SPIE Conference, Feb. 12-18, 2000.

Richard Robb, "Virtual (Computed) Endoscopy: Development and Evaluation Using the Visible Human Datasets", Oct. 7-8, 1996. www.mayo.edu.

I. Bitter et al., "Penallized-Distance Volumetric Skeleton Algorithm", IEEE Transactions on Visualization and Computer Graphics, vol. 7, No. 3, Jul.-Sep. 2001, pp. 195-206.

M. Wan et al., "Distance-Field Based Skeletons for Virtual Navigation", *Visualization* 2001, San Diego, CA, Oct. 2001.

M. Sato et al., "An automatic colon segmentation for 3D virtual colonoscopy", IEICE Trans. Information and Systems, vol. E84-D, No. 1, Jan. 2001, pp. 201-208.

D. Chen et al., "A Novel Approach to Extract Colon Lumen from CT Images for Virtual Colonoscopy" IEEE Transactions on Medical Imaging, vol. 19, No. 12, Dec. 2000, pp. 1220-1226.

M. Wax et al., "Virtual Colonoscopy—CT Contrast Agent", Second International Symposium on Virtual Colonoscopy, Boston, MA, Oct. 2000.

K. Kreeger, et al., "Volume Rendering for Virtual Colonoscopy on an Affordable PC", Second International Symposium on Virtual Colonoscopy, Boston, MA, Oct. 2000.

S. Lakare et al., "3D Digital Cleansing Using Segmentation Rays", IEEE Visualization 2000 Conference Proceedings, ACM/SIGGRAPH Press, pp. 37-44, Oct. 2000.

S. Lakare et al., "Automated Pre-navigation processing for Virtual Colonoscopy", Second International Symposium on Virtual Colonoscopy, pp., Oct. 2000.

K. Kreeger et al., "Perspective Virtual Endoscopy with VolumePro Parallel Rendering", Center for Visual Computing and Department of Computer Science, pp. 1-8.

D. Chen et al. "A tree-branch searching, multi-resolution approach to skeletonization for virtual endoscopy", SPIE Medical Imaging 2000, Feb. 2000.

M. Wan et al., "3D Virtual Colonoscopy with Real-time Volume Rendering", SPIE Medical Imaging 2000, Feb. 2000.

M. Wax et al., "Advancing Virtural Colonoscopy to Practice", International Workshop on 3D Imaging and Virtual Endoscopy, Feb. 2000.

W. Li et al., "Virtual Colonoscopy Powered by VolumePro", pp. 1-13, month unavailable 1999.

M. Wan et al., "Volume Rendering Based Interactive Navigation within the Human Colon", IEEE Visualization '99 conference, San Francisco, CA, Oct, 1999, pp. 397-400.

R. Chiou et al., "Interactive Fly-Path Planning Using Potential Fields and Cell Decomposition for Virtual Endoscopy", IEEE Trans. Nuclear Sciences, vol. 46, No. 4, Aug. 1999, pp. 1045-1049.

D. Chen et al., "MR Imaging and Segmentation of the Colon Wall for Virtual Colonoscopy", Soc. Magn. Reson. Medicine, vol. 3, pp. 2203.

R. Chiou et al., "Volume Segmentation and Rendering of Mixtures of Materials for Virtual Colonoscopy", SPIE Medical Imaging '99, Feb. 1999, pp. 133-138.

Z. Liang et al., "On Segmentation of Colon Lumen for Virtual Colonoscopy", SPIE Medical Imaging, Feb. 1999, pp. 270-278.

Z. Liang et al., "Virtual Endoscopy in Early Detection of Cancers", Biomedical Imaging Symposium: Visualizing the Future of Biology and Medicine, Washington, D.C., Feb. 1999.

R. Chiou et al., "Unified Analysis, Modeling, Matching and Synthesis for CT Color Texture Mapping from the Visible Human Dataset", The Second Visible Human Project Conf., Bethesda, MD, Oct. 1998.

M. Wan et al., "Boundary Cell-Based Acceleration for Volume Ray Casting", Computer & Graphices, vol. 22, No. 6, 1998, pp. 715-721.

R. Chiou et al., "Interactive Path Planning for Virtual Endoscopy", Conf. Record IEEE NSS-MIC, Nov. 1998.

M. Wax et al., "Electronic Colon Cleansing for Virtual Colonoscopy", Presentation at the first Int'l. Conf. on Virtual Colonoscopy, Boston, MA, Oct. 1998.

L. Hong et al., "Virtual Voyage: Interactive Navigation in the Human Colon", Proc. ACM SIGGRAPH '97, Aug. 1997, pp. 27-34.

A. Viswambharan et al., "Virtual Colonoscopy: Three-dimensional Reconstruction of the Mucosal Surface of the Colon", Conf. of Radiological Society of North America (RSNA), Dec. 1996, pp. 565 (Scientific Merit Award).

L. Hong et al., "Physcially-Based Interactive Navigation", Technical Report TR.96.01.09, Computer Science Department, SUNY at Stony Brook, Jan. 1996.

L. Hong et al., "Visible Human Virtual Colonoscopy", Conference of National Library of Medicine Visible Human Project, Oct. 1996, pp. 29-30.

$80^{th}$ Scientific Assembly and Annual Meeting Nov. 27-Dec. 2, 1994, Radiology Society of North America Founded in, InfoRAD Exhibits.

Taosong He, et al. "Collision Detection for Volumetric Objects", Proceedings of the $8^{th}$ IEEE Visualization Conference, 1997 1070-2385/97.

Yaoping Wang et al., "Real-Time Interactive Simulator for Percutaneous Coronary Revascularization Procedures", Computer Aided Surgery, 3:211-227, 1998.

Pending application with common assignee and potentially related subject matter—U.S. Appl. No. 11/613,306.

Pending application with common assignee and potentially related subject matter—U.S. Appl. No. 10/182,217.

Pending application with common assignee and potentially related subject matter—U.S. Appl. No. 10/297,349.

Pending application with common assignee and potentially related subject matter—U.S. Appl. No. 10/380,211.

Pending application with common assignee and potentially related subject matter—U.S. Appl. No. 10/246,070.

Pending application with common assignee and potentially related subject matter—U.S. Appl. No. 10/246,015.

Pending application with common assignee and potentially related subject matter—U.S. Appl. No. 11/613,283.

* cited by examiner

SUM THE DISTANCE ALONG THE CURVED LINE

OUTER ANGLE

INNER ANGLE

A: AIR VOXELS
B: AIR BOUNDARY VOXELS

ENHANCED VIRTUAL NAVIGATION AND EXAMINATION

The subject matter of this application was funded in part by the National Institute of Health, contract number CA79180 and the U.S. Office of Naval Research, grant number N000149710402. From these grants, the U.S. government may have certain rights to the invention.

FIELD OF THE INVENTION

The present invention relates generally to computer-based three dimensional visualization and more particularly relates to improved methods for virtual navigation and examination including identifying regions which have been missed during navigation and electronic cleansing.

BACKGROUND OF THE INVENTION

The use of 3D imaging techniques for exploring virtual representations of objects is known. For example, medical image data can be transformed into a 3D virtual representation of an organ, such as the colon, to allow a thorough examination of the region. In the case of conventional optical colonoscopy, the field of view available is generally directed only along the direction of navigation through the colon. As illustrated in FIG. 1, because of the folded nature of the colon lumen, this can result in a substantial portion of the colon not being visible during optical colonoscopy. Of course, in virtual colonoscopy, the viewer can change navigation direction and can also orient the virtual camera in any direction. While this flexibility allows the radiologist or other viewer to explore the entire surface of the colon, it is often difficult or impossible for a viewer to know whether a particular region has been explored. Thus, improved navigational aids would be desirable.

In addition to being used to view a virtual object, the 3D virtual environment can also be used to perform quantifiable analysis, such as distance and volume measurements in a region of interest. In present systems, such measurements generally involve the use of manually outlining a region for volume measurements. In addition, 3D ray-surface intersection have been used to perform length, diameter and angular measurements. Such techniques tend to be time consuming or computationally expensive. Thus, improvements for performing quantitative measurements in a virtual environment are desired.

An additional problem which is encountered during virtual examination is removing extraneous material from the object which is subject to examination. For example, in the case of virtual colonoscopy, it is necessary to remove stool and fluid from the colon to expose the surface of the colon wall. The traditional pre-imaging protocols for effecting colon cleansing are unpleasant and impose a deterrent to patients from obtaining such examination. Although electronic cleansing techniques are known, these techniques still encounter difficulties in properly removing material, such as in regions of intersection of two or more material types. Thus, improved electronic cleansing of a virtual object would be beneficial in such virtual examination applications.

SUMMARY OF THE INVENTION

In accordance with the present invention, a method for enhancing virtual examination of an object provides for insuring that a virtual examination is thorough. The method includes marking voxels in an image dataset as viewed when those voxels are presented on a user display as part of a rendered image. By marking viewed voxels, it is then possible to identify the unmarked voxels upon completion of an initial examination. Once the unviewed regions are identified, a user display identifying all regions of voxels identified which have a size larger than a predetermined threshold is provided.

Preferably, the user display is a 2D planar projection of a 3D closed object. For example, a colon lumen can be "unraveled" into a 2D planar surface to exposes the entire inside surface of the colon. The 2D planar projection can provide the display for a graphical user interface, which allows the user to select a region of unviewed voxels such that a display of the 3D closed object at the selected region is presented for examination.

A further method in accordance with the present invention provides for quantitative measurement of physical parameters of a virtual object. This method includes placing at least one measuring disk at a location along a centerline of a virtual object. The measuring disk is a fiducial marker which defines a plane that is aligned perpendicular to the centerline of the object.

By using a single measuring disk, diameter measurements can be taken. Using two measuring disks, a distance along the centerline and the volume of a region can be measured. With three measuring disks, angular measurements can be performed.

Yet another method for enhancing a virtual examination includes electronically cleaning a virtual object. This method includes defining a number of intensity value ranges which represent corresponding material type classifications in the image. At least one set of intersection conditions which correspond to expected intersection regions are also defined. The intersection conditions are generally defined based on observed, repeatable characteristics of the intensity profile in the intersection regions. Boundary regions between at least a portion of the material type classifications are then identified in the image data. From the boundary regions, segmentation rays are cast towards neighboring voxels to detect regions which satisfy the defined intersection conditions. Once identified, intersection region specific correction is performed on the detected regions. Volumetric contrast enhancement can also be performed to further resolve any remaining partial volume effects.

Boundary regions can be identified by selecting a material type for segmentation; identifying seed voxels in the regions of the selected material type; and then applying region growing from the seed voxels until a boundary between the selected material type and another material type is detected.

In the case of virtual colonoscopy, the virtual object is a colon and the material type classifications include air, soft tissue, and fluid-stool-bone. In this case, intersection regions include air-soft tissue, air-stool and air-fluid regions. Upon detecting an air-soft tissue region, the intersection specific correction labels at least a portion of the voxels of the ray as colon wall and labels a portion of the voxels of the ray as mucosa. Upon detecting an air-fluid region, the intersection specific correction labels voxels of the region as air voxels. Upon detecting an air-stool region, the intersection specific correction includes reconstructing the voxels in the region by labeling at least a portion of the stool voxels as fluid voxels and labeling a portion of the voxels of the ray as mucosa.

Also in accordance with the present invention is a method for coordinating the display of a 3D image and one or more corresponding 2D images. This method includes displaying a 3D image of a region along with displaying a moveable slice marker on the 3D image. A 2D image corresponding to the position and orientation of the slice marker is also displayed.

If a different 2D image is selected, such as by manipulating a user interface, the marker position in the 3D image changes accordingly. The 2D images are generally cross-sectional slices such as sagital, a coronal, axial or centerline-normal cross sectional images.

Figure 1:
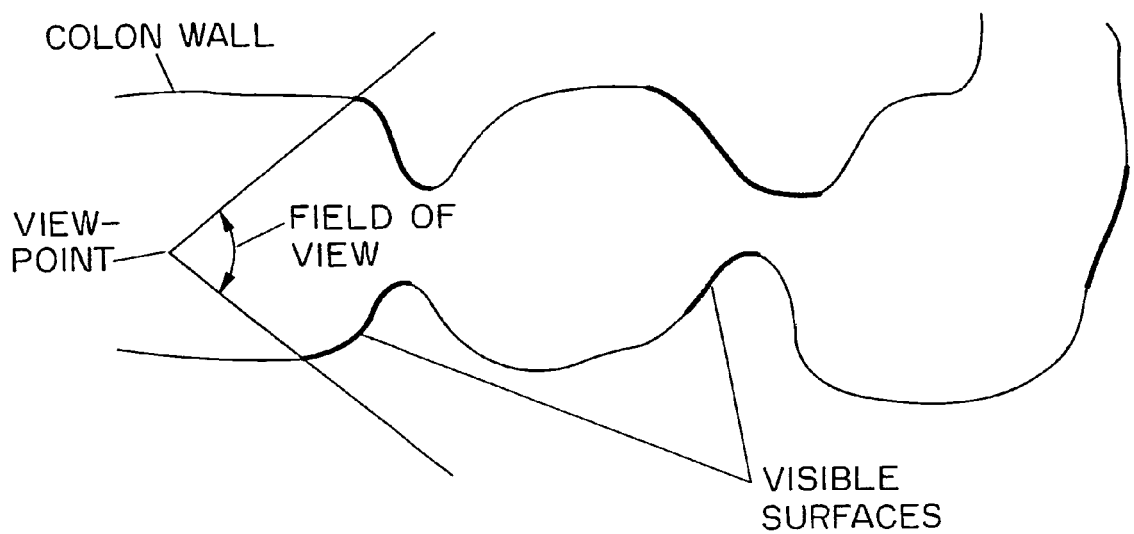
FIG. 1 is a pictorial view of a cross section of a colon lumen illustrating regions of visible surfaces during conventional optical colonoscopy.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF PREFERRED EMBODIMENTS

Many systems are known for performing 3D visualization, navigation and examination. These systems generally provide for image data acquisition, such as an MRI scanner, and a computer processing platform for transforming the 2D image data into a useful 3D virtual representation of the imaged object. For example, such a system and methods are described in U.S. Pat. No. 5,971,767 to Kaufman et al. entitled "System and Method for Performing a Virtual Examination," which is hereby incorporated by reference in its entirety. The present invention relates to improvements in such systems which enhance the ability of the user to examine and quantify parameters of the object being examined in the virtual environment.

Figure 2:
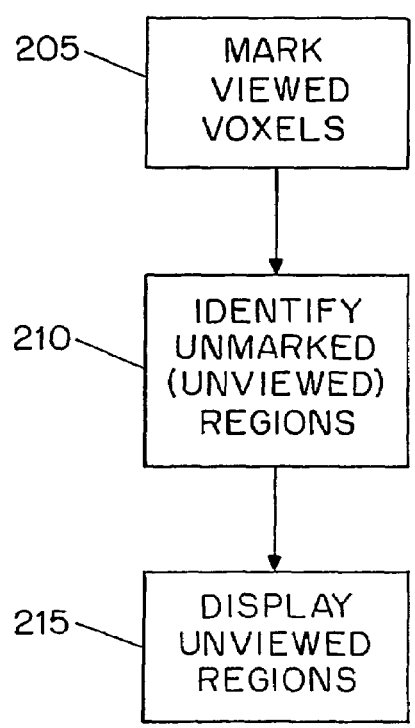
FIG. 2 is a simplified block diagram of a method for determining regions missed during navigation.

As illustrated in FIG. 2, a method for enhancing a virtual examination allows a user to quickly identify areas which have not been examined and to be brought to those areas in order to complete a full examination of a virtual object. This process involves marking those areas which have been viewed during navigation (step 205) and using this marked data to identify those regions which have not been viewed (step 210). Once the unviewed regions have been identified, this information can be presented to the viewer in various forms. (Step 215).

The process of marking areas which have been viewed (step 205) can be performed by storing, in computer readable media, an auxiliary volume buffer that is updated by marking those portions of the volume which are presented to the user on a display during image rendering of the main image data. The marking process can be a binary marking process, designating voxels as viewed versus not viewed. Alternatively, the marking of those regions which have been viewed can be a quantitative marking process which captures a measure of how the given voxel was used during the navigation. For example, a numeric value proportional to a particular voxels participation while being displayed can be stored.

When navigation is complete, the auxiliary volume is analyzed to identify voxels which have not been marked as viewed. When an unmarked voxel is identified, a region growing algorithm can be used to determine the boundaries of the "missed patch" in which the seed voxel belongs. This process is repeated until substantially all of the voxels which make up the surface of the object have been tagged as either viewed or as part of a missed patch. In the case of a continuous marking application, the user can define a value in the marking range as the stop value for region growing. The missed patch of continuously marked voxels can then be displayed as a gray scale or multi-color region which signifies the level of use of the voxels in the missed patch.

Figure 4:
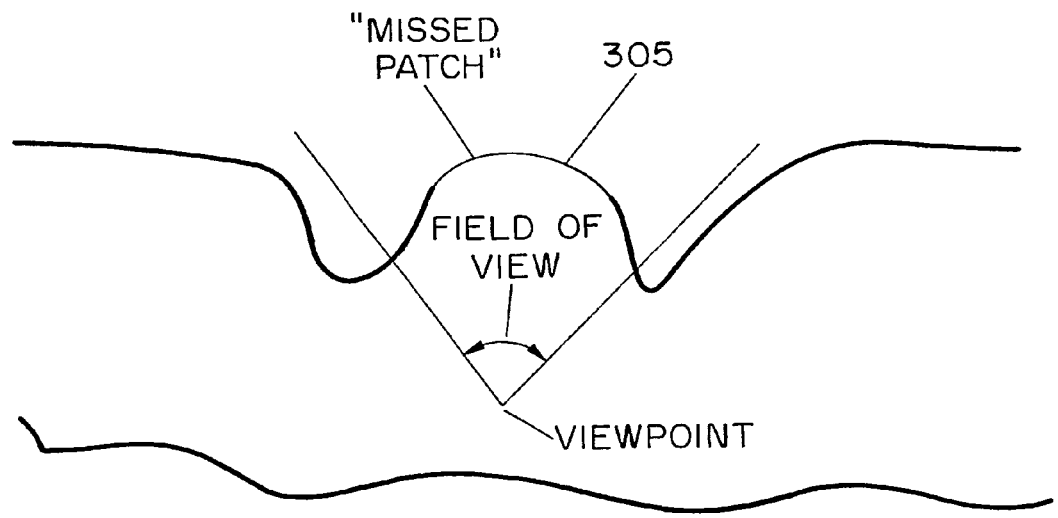
FIG. 4 is a pictorial view of a cross section of a colon lumen illustrating a virtual camera being brought to a selected "missed patch" for viewing.
Figure 3:
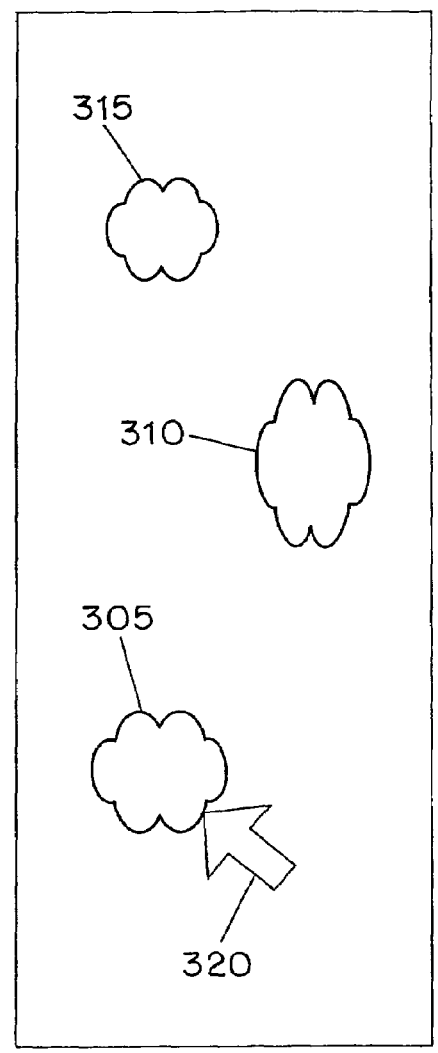
FIG. 3 is a pictorial diagram illustrating a planar representation of lumenal object mapped to a 2D plane to improve the visualization of missed regions of an object.

In many virtual display environments, the object being examined, such as a virtual colon, has properties, such as folds and curves, which make it difficult to observe certain areas of the object during normal navigation and examination. Thus, in displaying regions marked as unviewed, it is desirable to "unravel" a lumen shaped object, such as the colon, by mapping the lumen to a 2D planar representation, such as illustrated in FIG. 3. There are a number of known techniques for mapping a 3D surface, such as tube or sphere, to a 2D space which can be used to perform the present invention. Many of these techniques, such as Mercator, oblique, cylindrical and stereographic mapping have been used extensively in the field of map making, where surfaces of the globe must be represented on a planar map. It is known, however, that each method introduces some level of distortion in 2D representation. Thus, the 2D display, while of value in enhancing the visibility of missed patches 305, 310, 315, is not suitable for other purposes in visualization and examination. Instead, it is preferred that the 2D display provides the user with an effective way to visualize and select a missing patch 305 using a graphical user interface 325. By selecting a particular missed patch, the system can then automatically bring the user to a display of the original 3D volume where the virtual camera is directed to the missed patch, as illustrated in FIG. 4. As a user selects the missed patches and examines these regions, the region can be marked as viewed and removed from the 2D representation of missed patches on the object surface.

As an alternative to displaying the missed patches on a 2D map, the missed patches can be identified in a list of coordinates or as a series of selectable bookmarks in tabular form. The user can then sequentially view the designated regions or can manually select the various regions from the list of bookmarks. In either case, the user is presented with an indication of regions which were not viewed during initial examination thereby allowing the viewer to accomplish 100 percent viewing of the surface of interest.

In certain applications of 3D visualization, it is desirable to not only view a region, but also to perform quantitative measurements in a region of interest. An example of this can be found in the context of evaluating the aorta for abdominal aortic aneurysm (AAA) treatment. In this regard, it is clinically important to determine the volume and position of an identified thrombosis to determine the extent of the disease and in treatment planning, such as stent design and placement. The present invention uses a concept referred to as measuring disks to facilitate such quantitative measurements.

Figure 5:
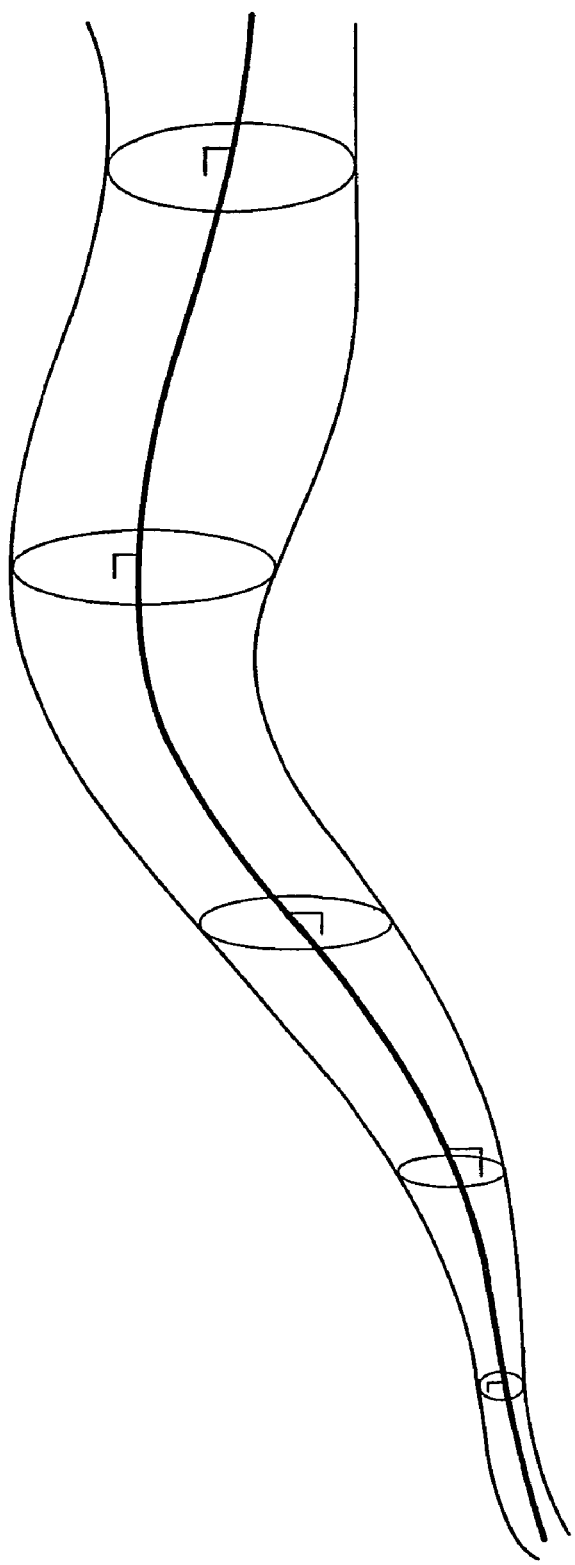
FIG. 5 is a pictorial diagram illustrating an exemplary use of "measuring disks" for performing quantitative measurements in virtual visualization applications.

A measuring disk is a flat plane which intersects the surface of a virtual object as its travels along a centerline about the disk origin, while remaining perpendicular at the point of local centerline intersection. An example of a number of measuring discs placed within a lumen is illustrated in FIG. 5. While the use of a disk shape is preferred, it is not necessary. For example, any other shape which acts as a fiducial marker on the center line and projects perpendicularly therefrom can generally be used.

The radius of a measuring disk is adaptive in that it conforms to the dimensions of the structure in which it resides. Based on user preference, the disk can have a circular radius equal to the maximum interior radius of the lumen or the minimum interior radius of the lumen at each point along the centerline. In the event the minimum interior radius is preferred, the measuring disk will be fully contained within the virtual object with the possibility of small gaps occurring in places larger than this minimum. If the maximum radius is preferred, portions of the disk may extend through the surface of the object being examined.

To perform repeatable, quantitative measurements, a user will place one or more measuring disks along the centerline of the object at selected points of interest. This is generally an interactive process which is performed using a graphical user interface, such as a computer mouse controlling a pointer on a computer display, to position the disks within the object which has been rendered translucent or transparent on the display.

Figure 6:
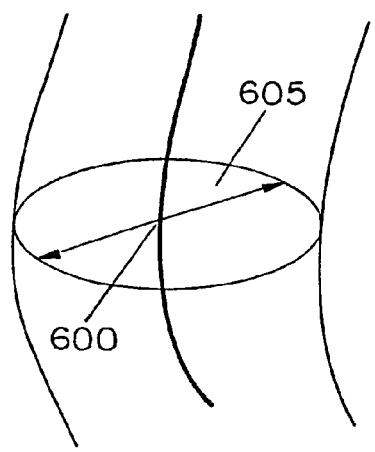
FIG. 6 is a pictorial diagram illustrating an exemplary use of measuring disks in order to determine the diameter of a region of interest.

As illustrated in FIG. 6, the diameter of a lumen at a given point 600 can be determined by the placement of a single measuring disc 605 at this location.

Figure 7:
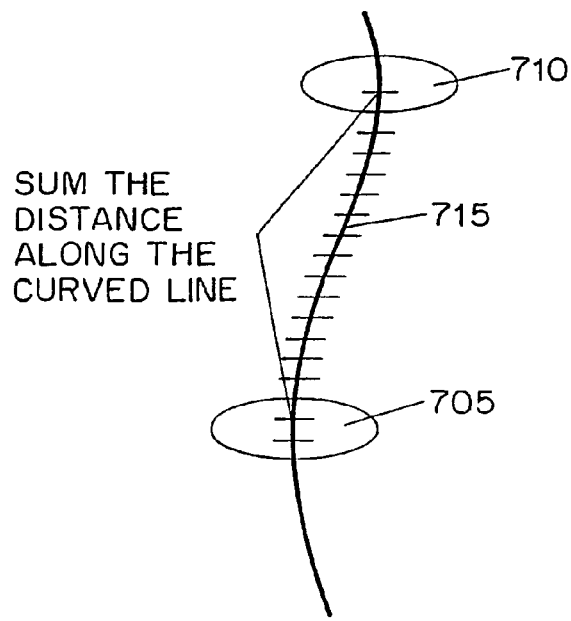
FIG. 7 is a pictorial diagram illustrating an exemplary use of measuring disks in order to determine the length of a region of interest.

As illustrated in FIG. 7, length measurements can be simplified by placing a first measuring disk 705 at a first location of the lumen and a second disk 710 at a second location of the lumen. The length along the segment of the centerline 715 between measuring disks 705, 710, rather than the Euclidean length between the points, is determined and used as the actual length of the segment of interest. This provides accurate measurements of length for objects which may be tortuous, such as regions of the colon and aorta.

Figure 8:
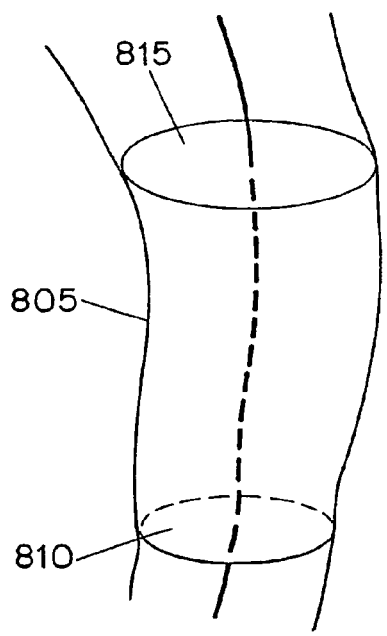
FIG. 8 is a pictorial diagram illustrating an exemplary use of measuring disks in order to determine the volume of a region of interest.

Referring to FIG. 8, the volume of a region can also be determined using two measuring disks. In this case, a volume is contained by the boundary 805 of the region of interest and measuring disks 805, 810. The volume can be determined in this captured region can be determined by counting the number of voxels contained in the captured region and multiplying this number by the equivalent volume of a single voxel.

Figure 9:
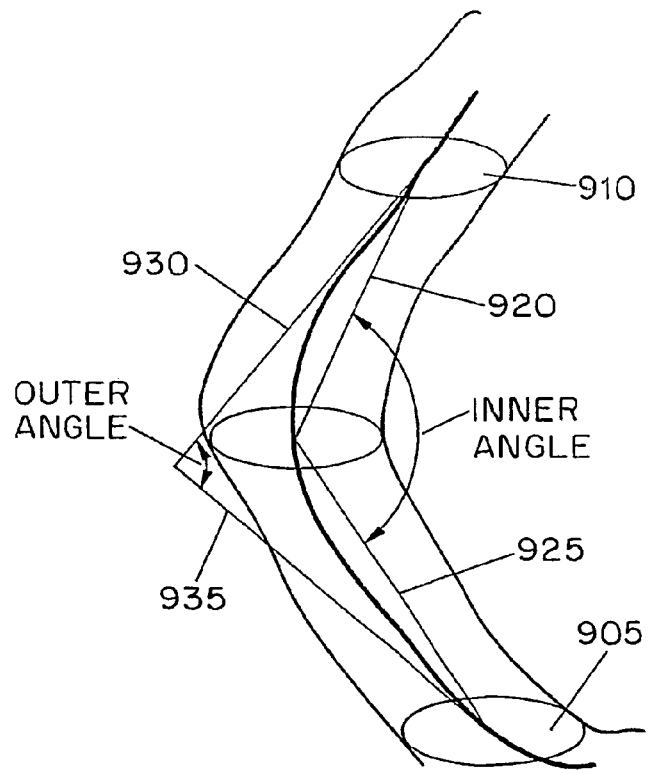
FIG. 9 is a pictorial diagram illustrating an exemplary use of measuring disks in order to determine the angle of curvature of a region of interest.

FIG. 9 illustrates the use of three measuring disks to determine the angle of curvature of an object of interest. The three disks define two endpoints 905, 910 and the vertex of an inner angle and an outer angle. The disks can be positioned independently along the lumen to variably define the endpoints and vertex of interest. The angle can be defined as an inner angle, which is defined by the intersection of rays 920, 925 which join the origins of the disks 905, 915 and 910, 915. The angle can also be defined as an outer angle. In this case rays 930, 935 is projected from the origin of each end point disk 905, 910 along a tangent of the centerline towards the vertex. The origins of the three measuring disks are used to define a common plane on which to project the rays. In this way, the rays projected from the endpoints are guaranteed to converge.

Electronic Cleansing Using Segmentation Rays

A common problem in virtual (and conventional) examination of objects, such as the colon, is the removal of residual material from the object. In the case of the colon, colonic fluid and stool within the colon may mask polyps if not removed. Traditionally, removal of such stool and fluid requires significant pre-imaging protocols which require the ingestion of large quantities of fluids and contrast agents and pre-imaging enema's to complete colonic cleansing. As disclosed in U.S. application Ser. No. 09/343,012, filed on Jun. 29, 1999, entitled "System and Method for Performing a Three-Dimensional Virtual Segmentation and Examination," which is hereby incorporated by reference in its entirety, electronic cleansing techniques, such as image segmentation, can be used to effectively clean a virtual object. The present invention introduces an improved method for segmentation and digital cleansing of a virtual object, such as a colon, which provides effective treatment for areas which exhibit a partial volume effect which prevents removal by traditional segmentation.

Figure 10:
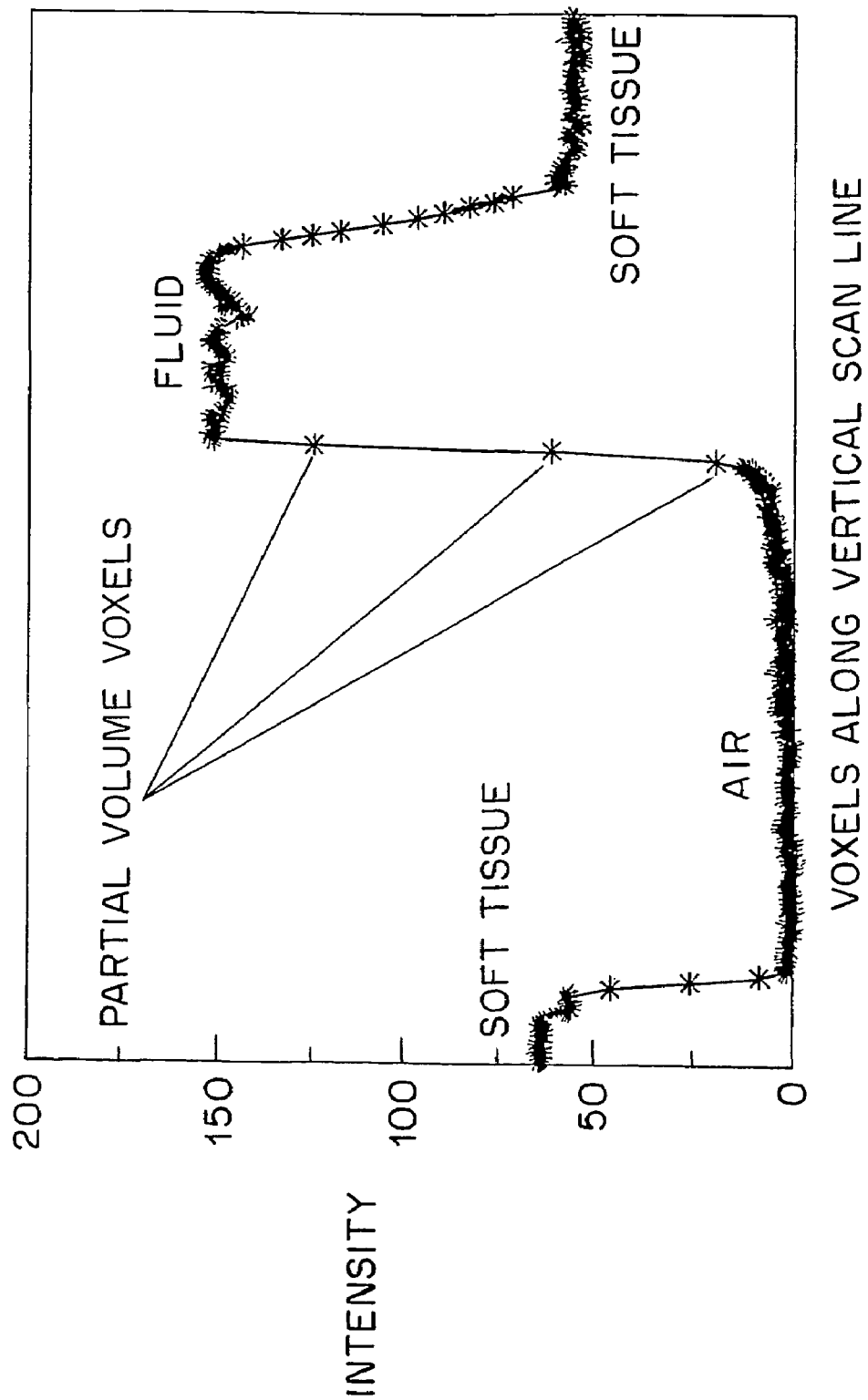
FIG. 10 is a graph which illustrates an exemplary intensity profile for CT image data of a colon.

FIG. 10 is a graph which illustrates an exemplary intensity profile for CT image data of a colon. In this intensity graph, there are three distinct plateau levels signifying soft tissue 1005, air 1010 and fluid voxels 1015. The high intensity of the fluid is the result of ingestion of a contrast agent prior to imaging. While these regions are readily distinguishable using traditional image segmentation techniques, the sloped parts of the graph which represent the interface of these regions are difficult to classify. These voxels are considered partial volume effect (PVE) voxels 1020 since the intensity is effected by a mix of voxels of the two regions forming the intersection. Because PVE voxels are difficult to classify using segmentation, the boundary between regions is often distorted and may not accurately reflect the region of interest. For example, alliasing effects of segmentation may result in abrupt borders which remove intermediate layers of material such as colonic mucosa. However, such intermediate regions may be valuable diagnostic aids and should be preserved in the segmented image.

The present invention introduces the notion of segmentation rays which are projected from boundary voxels to identify regions of intersection using predetermined intersection characteristics. When a region of intersection is identified, intersection specific adjustments are performed to resolve ambiguities resulting from the partial volume effect.

Figure 11:
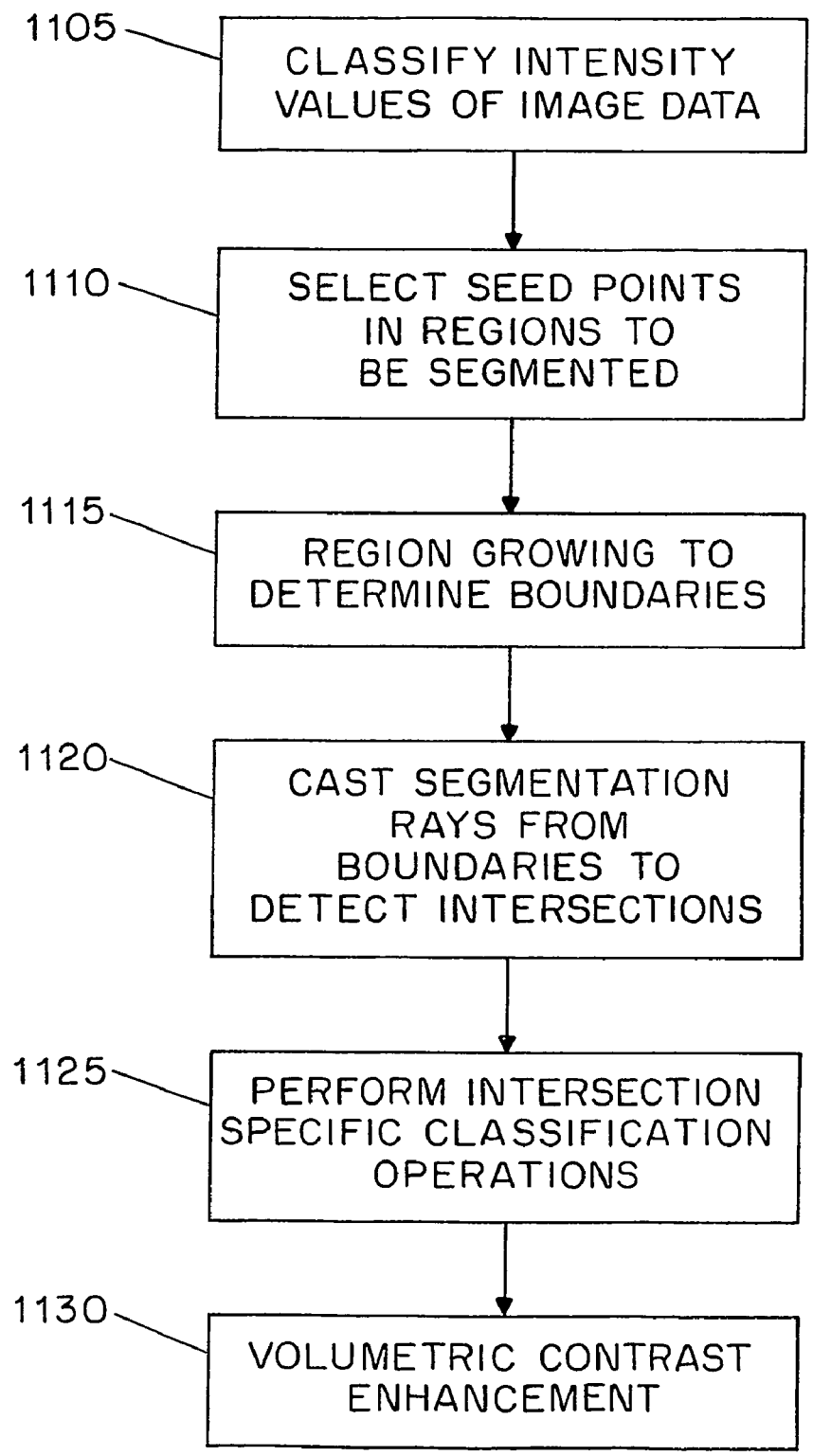
FIG. 11 is a flow chart which illustrates an overview of the present segmentation ray electronic segmentation process.
Figure 12:
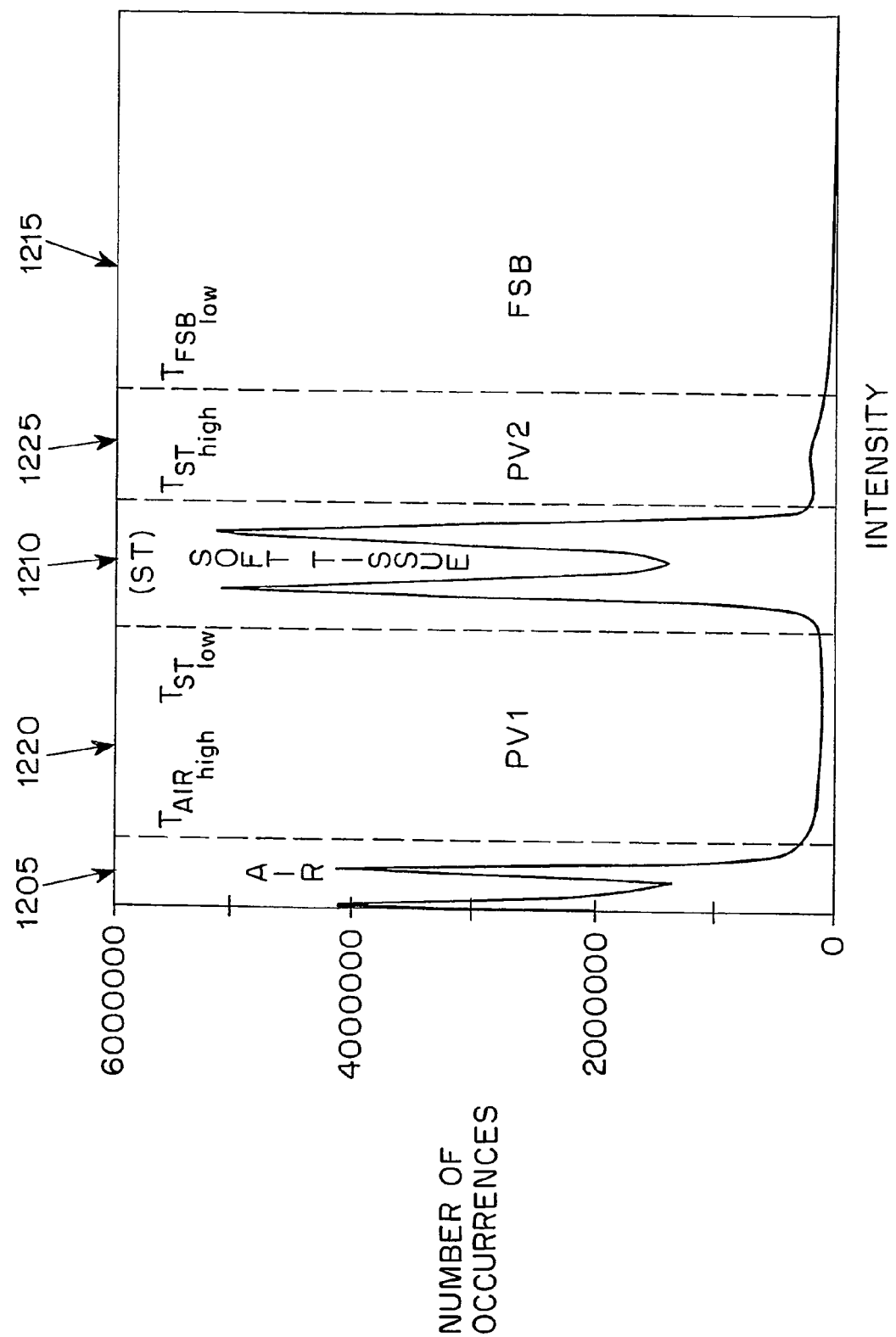
FIG. 12 is a graph illustrating an intensity histogram of representative CT data of a colon.

FIG. 11 is a flow chart which illustrates an overview of the present segmentation ray electronic segmentation process. In step 1105, the image data is classified into a predetermined number of categories or bins based on expected intensity value. For example, in the intensity histogram of representative CT data of a colon illustrated in FIG. 12, regions designated as air (AIR) 1205, soft tissue (ST) 1210 and fluid, stool, bone (FSB) 1215 can be defined by ranges of intensity values. In addition, there are generally one or more regions of partial volume effect, such as PV1 1220 and PV2 1225. The classifications are generally assigned by the system or the user based on prior knowledge of the object being imaged and the expected intensity values for the material being imaged. The unique intensity profiles for the different intersections between regions are studied to determine a set of characteristics which can be stored for later use.

In step 1110, seed points are located in those regions which are to be segmented. For example, in the case of electronic colon cleansing, it is desirable to identify and select seed voxels in AIR regions which are located within the colon. In this case, an effective technique is to identify a voxel which has an intensity in the FSB intensity region and then examine those voxels located directly above it. If an FSB voxel has an AIR voxel immediately above it, that AIR voxel is within the colon and can be stored as a seed voxel. This condition results from the fact that gravity forces the fluid to collect in the lower portions of the colonic folds and establish a smooth horizontal interface surface with the air which is within the colon. For FSB voxels outside the colon, such as bone, these voxels will be bordered by soft tissue, not air voxels, and the described condition will not be satisfied.

The process of detecting the seed voxels can be implemented by traversing each vertical scan-line in the image data to determine if the condition, i.e., AIR above FSB, is satisfied. If so, the AIR voxel is stored as a seed point in a suitable data structure, such as an array. When the seed point detection evaluation is complete, region growing can be used from each seed to determine the boundary between AIR and other regions. (Step 1115).

Region growing can be performed using a naive dilate-and growing strategy. This process can be made more efficient by maintaining a data structure for those voxels whose neighbors have not been analyzed. In a preferred naive dilate-and growing method, a first seed voxel is removed from the data structure and its neighbors are inspected. If a non-masked AIR voxel is found, this voxel is stored. If a masked AIR voxel is detected, this voxel is ignored. If a non-AIR voxel is found, this voxel is marked as a boundary voxel and is stored in a separate data structure (BV queue). After all neighbors have been evaluated, the voxel is masked to indicate that it has been processed. This process is repeated for all seed voxels. To identify neighboring non-masked voxels a 6-connection analysis (six neighbors evaluated) can be used. However, for evaluating boundary conditions a 26-connection (26 neighbors about the current voxel) is preferred to improve accuracy.

From the boundary voxels identified in step 1115, segmentation rays can be cast to determine areas which satisfy predetermined sets of intersection criteria which indicate various corresponding regions of intersection (step 1120). This step involves prior evaluation of the intensity profiles at exemplary regions of intersection and isolating a set of characteristics which differentiate the respective intersection regions. An example of this process will be described in the context of the expected intersection regions of the colon. It will be appreciated, that the particular sets of intersection characteristics are application specific and will depend on a number of variables, such as the materials being imaged.

In the case of the region growing operation described above in the context of virtual colonoscopy, the AIR regions within a colon are identified and boundaries of intersection between AIR and other regions determined. These intersections will represent either an AIR-ST intersection, and AIR-fluid intersection, or an AIR-stool intersection. By characterizing these intersections using unique properties observed in the intensity profiles of such regions of intersection, specific corrections can be applied to remove the partial volume effect.

Figure 13:
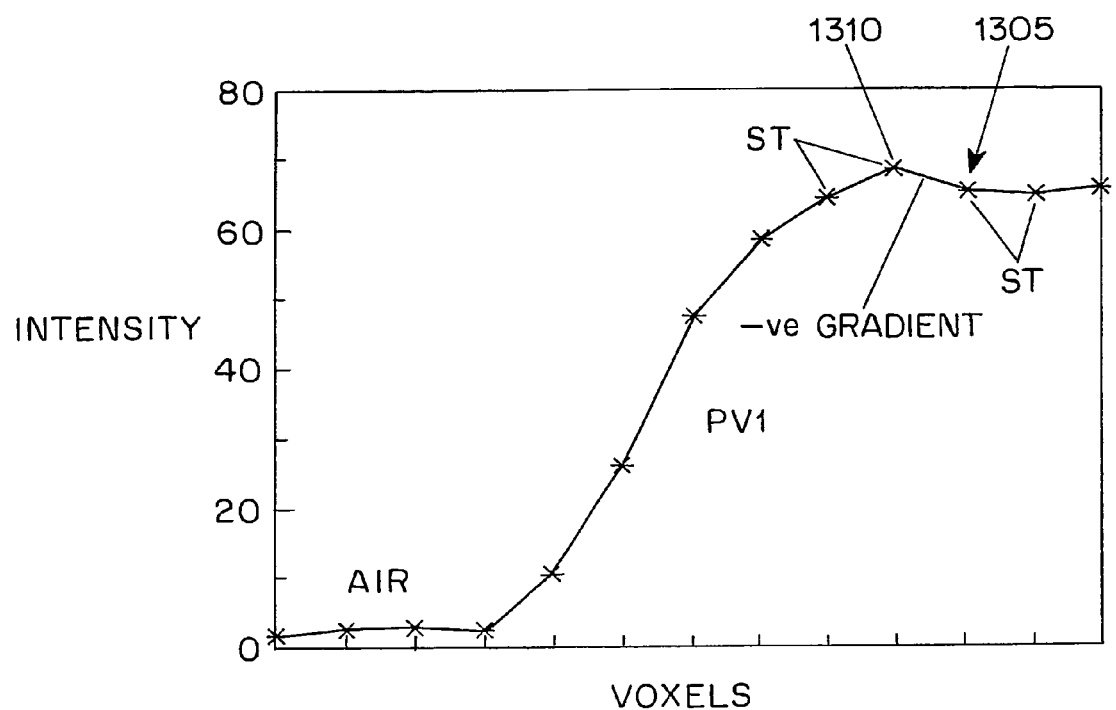
FIG. 13 is a graph illustrating an intensity profile at an intersection of air and soft tissue voxels within a colon.

For example, FIG. 13 is a graph illustrating an intensity profile at an AIR-ST intersection. This profile is characterized by: a gradual increase in the gradient as intensities transition from air, through PV1, to the soft tissue intensity and, possibly, to the PV2 region 1310 as well; after the first negative or zero gradient 1305, the intensity value remains in the ST range, the intensities do not enter the FSB region; and no more than one PV2 region voxel 1310 is present before a negative or zero gradient.

Figure 14:
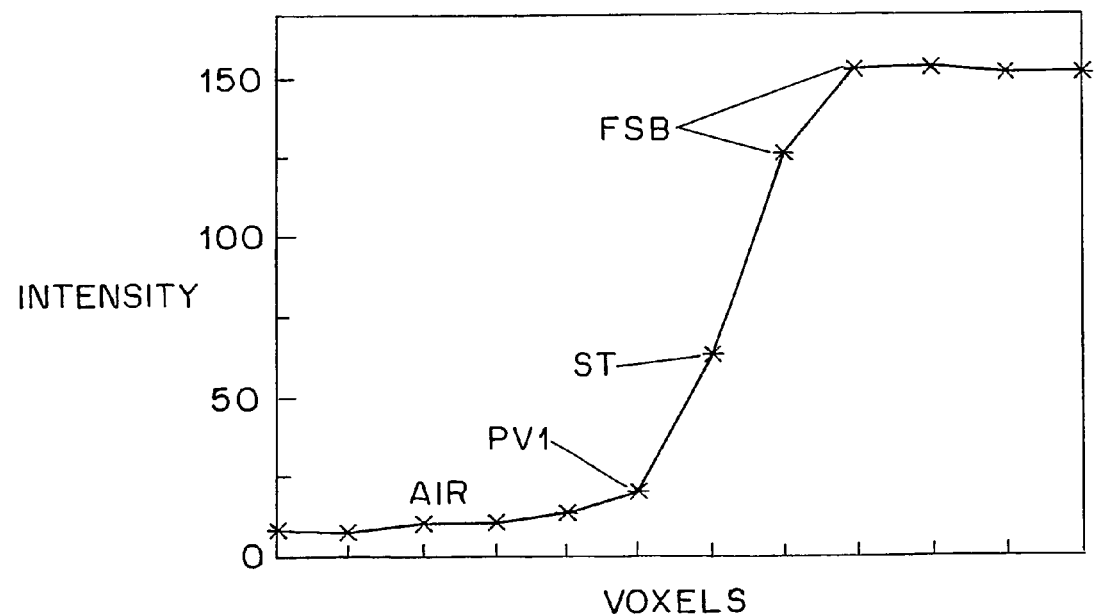
FIG. 14 is a graph illustrating the intensity profile of an intersection of air and fluid voxels within a colon.

FIG. 14 is a graph illustrating the intensity profile of an AIR-fluid intersection region. This intersection is characterized by: a sharp rise in the gradient as the intensity values move from air to FSB; the presence of three or less PV1 voxels encountered between the AIR and FSB regions; and the voxels following the first negative gradient remain in the FSB intensity range.

Figure 15:
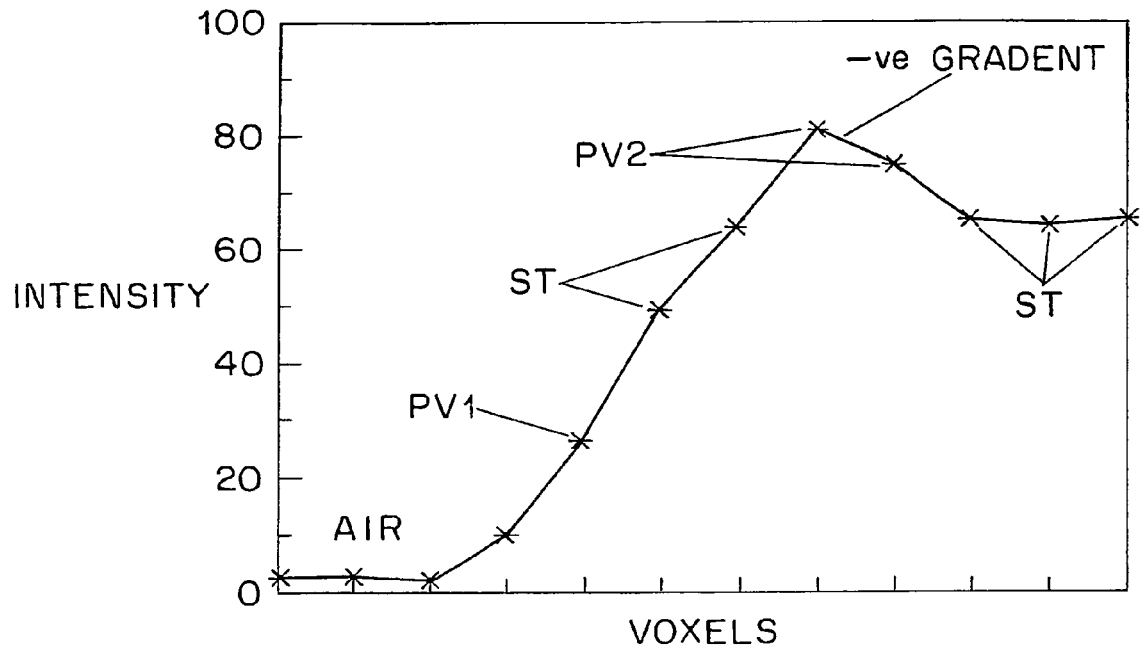
FIG. 15 is a graph illustrating the intensity profile of an intersection of air and stool voxels within a colon.

FIG. 15 is a graph illustrating the intensity profile of an AIR-stool intersection. This intersection is characterized by: a sharp rise in the gradient as the intensity values move from air to PV2 or FSB; and after the first negative gradient, the intensity values are in the PV2 region.

Figure 16:
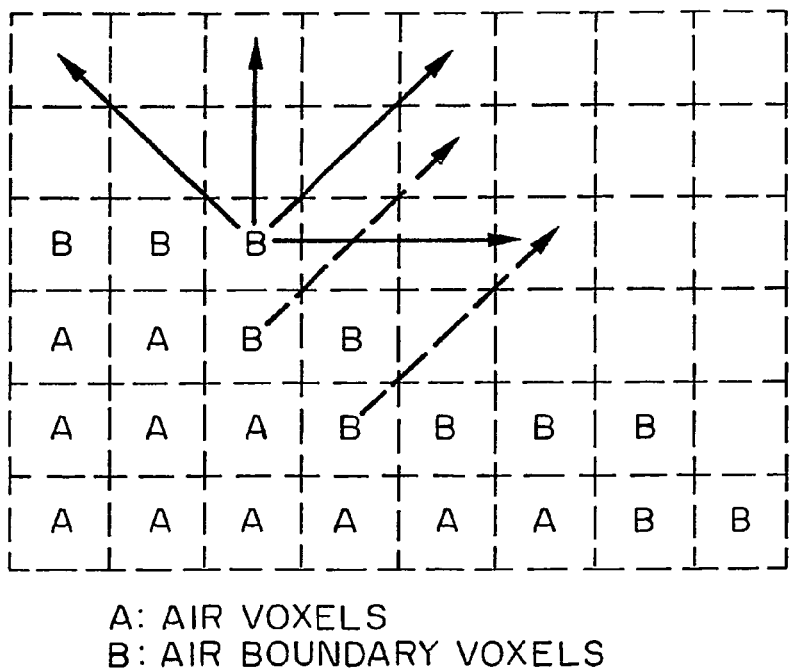
FIG. 16 is a simplified 2D graphical representation of casting segmentation rays from boundary voxels to locate regions of intersection.

For each of these intersection regions, AIR-ST, AIR-fluid, and AIR-Stool, the intersection is said to be found when the above conditions are satisfied. Thus, intersection detection requires testing the cast segmentation rays to determine if any of the sets of intersection conditions are met. Ray casting is performed at each of the identified boundary voxels. The rays are cast outwards in a direction to each of the 26-connected neighbors which are not the same type as the seed voxel (in this case, all neighbors which are not AIR voxels). A simplified 2D representation of the ray casting of step 1120 is illustrated in pictorial form in FIG. 16. In FIG. 16, the boundary voxels are marked B and the AIR voxels are marked A.

As the segmentation rays are extended, they are tested to determine if one of the sets of intersection conditions are met. If one of the predetermined sets of intersection conditions are met, a respective correction process, described below, can be applied. If no set of intersection conditions are satisfied within a predetermined ray distance, that ray is dropped.

Figure 17:
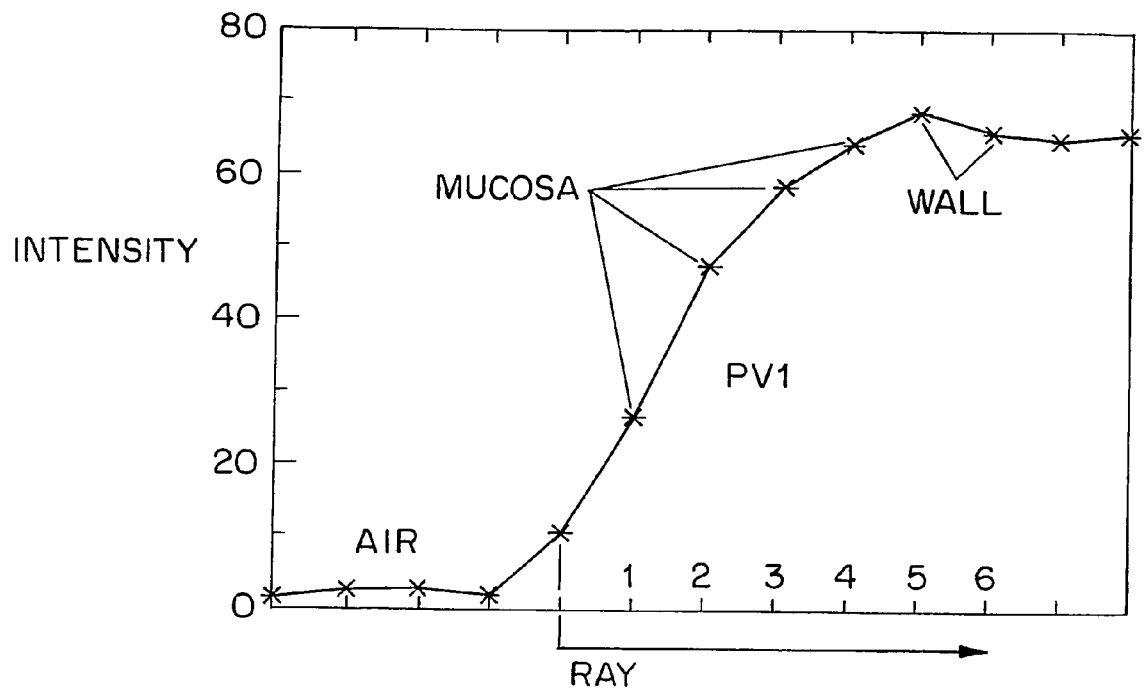
FIG. 17 is a graphical representation of the classification of voxels on a ray which detects an air-soft tissue intersection.
Figure 18:
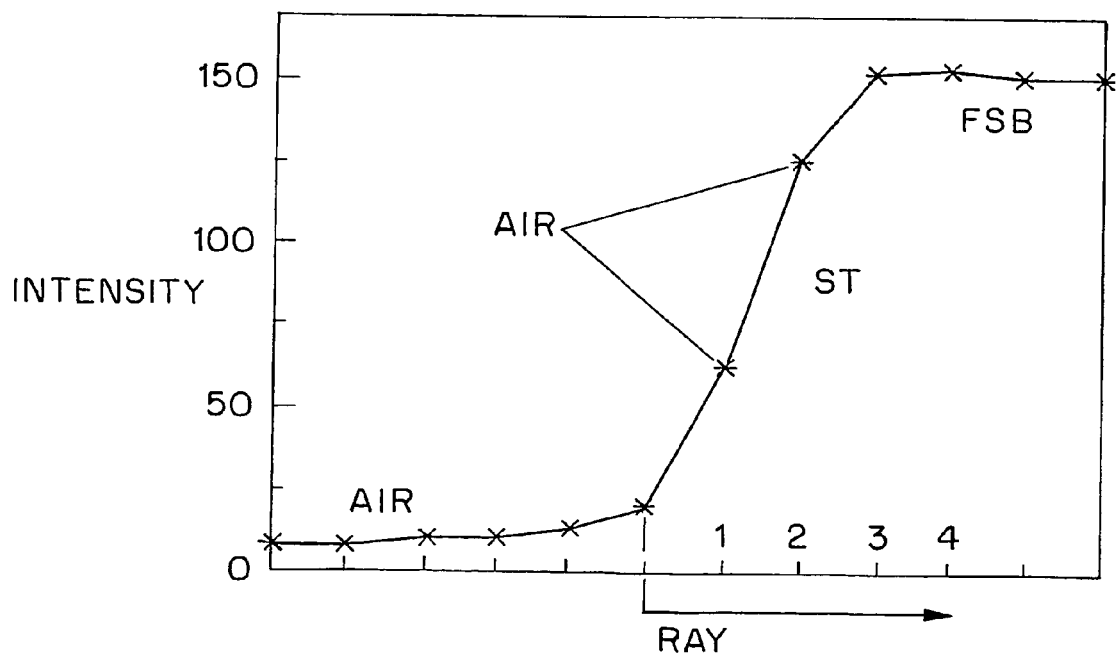
FIG. 18 is a graphical representation of the classification of voxels on a ray which detects an air-fluid intersection.
Figure 19:
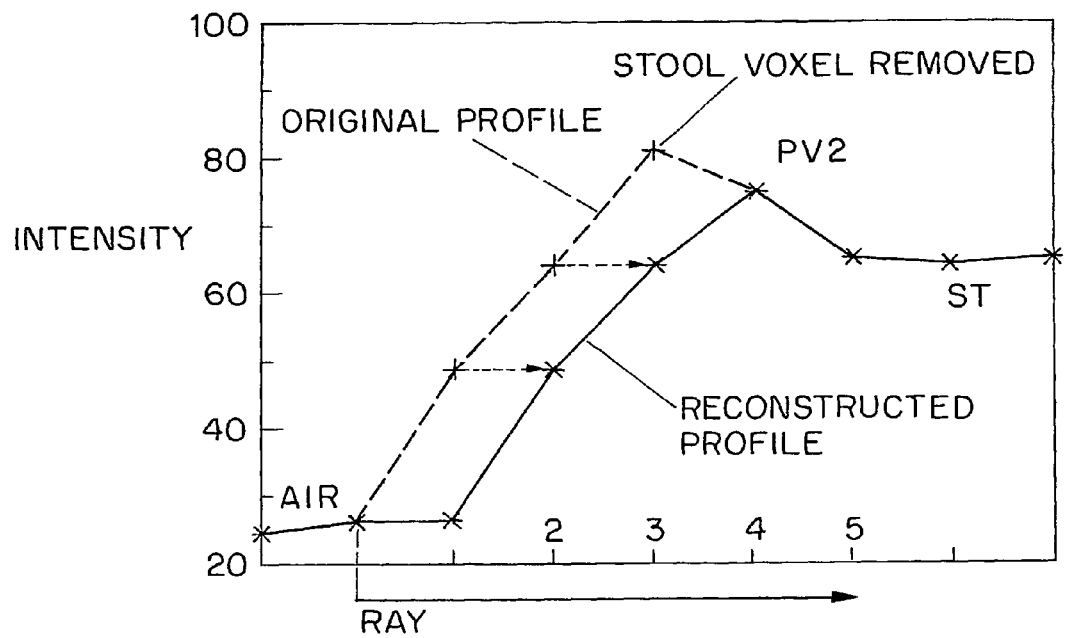
FIG. 19 is a graphical representation of the classification and reconstruction of voxels on a ray which detects an air-stool intersection.

The intersection correction processes are predetermined to correct for the expected errors introduced by the partial volume effect. As illustrated in the graph of FIG. 17, for a detected AIR-ST intersection, the last two voxels of the ray are designated as colon wall voxels and the remaining voxels on the ray are marked as mucosa voxels. While this is not intended to accurately distinguish between colon wall and mucosa, the inner contour of the colon wall which will show any polyps is accurately preserved. As illustrated in the graph of FIG. 18, for voxels in the AIR-fluid intersection, these voxels are removed by assigning the voxels an intensity in the AIR region. This operation continues the process of removing fluid voxels from the colon interior. For the AIR-stool intersection, the objective is to remove the stool voxels while preserving and correcting the position of the underlying mucosa voxels. This can be accomplished by moving the stool voxels along the ray and moving the mucosa voxels into their correct position as shown in the graph of FIG. 19.

Figure 20:
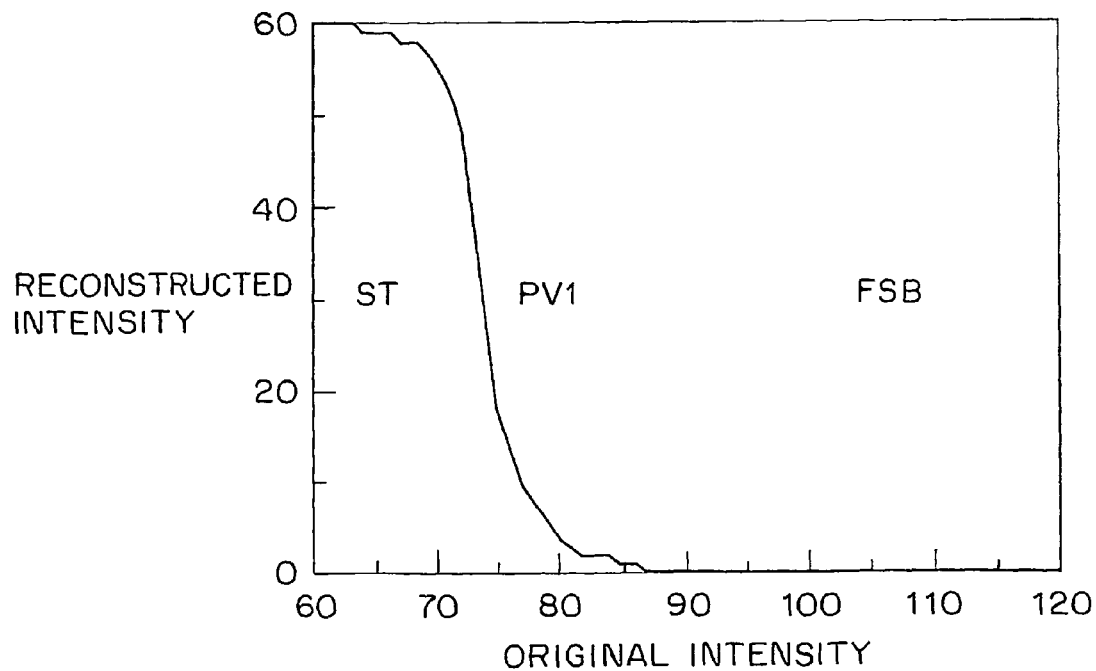
FIG. 20 is a graph illustrating an exemplary transfer function which can be used to map voxels from an original intensity to a reconstructed intensity during a volumetric contrast enhancement operation.

After the intersection region specific corrections have been applied, all of the partial volume voxels in the PV1 region, and some in the PV2 region are removed. What remains are high intensity voxels in the FSB range and partial volume voxels on the Fluid-ST intersection. Volumetric contrast enhancement of step 1130 can then be applied to correct these last conditions. The volumetric contrast enhancement applies the transfer function illustrated in the graph of FIG. 20 to increase the contrast between the ST region and the FSB region which is to be removed. Thus by mapping the original intensity of voxels to the reconstructed intensity (Y axis), such as by the use of a look up table, the voxels in the Fluid-ST intersection close to the ST intensity are moved into the ST region and are maintained whereas the voxels in the intersection closer to the FSB region or are moved into the FSB region for removal. The graph of FIG. 20, while preferred, is but one example of a transfer function which can be used to effect the desired contrast enhancement and it will be appreciated that other curves, even a straight line having a predetermined slope, can also be employed.

Fish-Eye Projection Imaging

Figure 21:
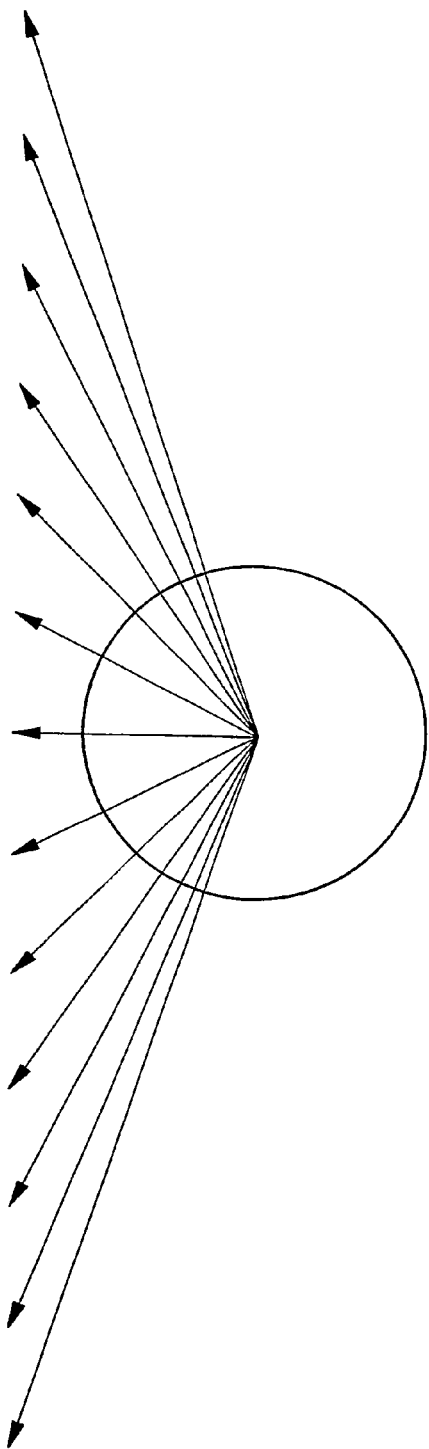
FIG. 21 is a diagram illustrating the projection of image rays in normal perspective projection.

In conventional computer graphics simulations, a perspective mapping is used to project 3D voxels onto the 2D image plane of the computer display. As illustrated in FIG. 21, perspective projection results in rays from a limited field of view being projected from the source into equally spaced positions on the image surface. This results in a minimally distorted image which closely resembles that which would be observed by a conventional camera. In certain cases, however, it would be desirable to provide a user with a wider field of view, i.e., >60 degrees. However, as the field of view widens, the image tends to become distorted. Further, a field of view of 180 degrees cannot be achieved with normal perspective projection.

Figure 22:
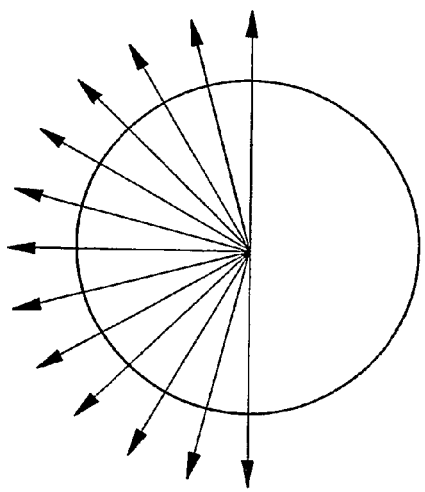
FIG. 22 is a diagram illustrating the projection of image rays using equal angular spacing to increase the field of view.

The present application of equidistant fish eye projection can be used in virtual examinations to provide an increased field of view which retains critical features, such as the spherical nature of polyps being examined in virtual colonoscopy. As illustrated in FIG. 22, the objective is to project the image rays along an equal angular spacing from the origin.

The projection of a voxel (x,y,z) onto the image plane is performed by computing two angles ($\phi$, $\theta$) relative to the forward viewing direction and the right vector respectively. The voxel is then mapped to image coordinates (u,v) by a polar mapping:

$u = \phi * \cos \theta$ $v = \phi * \sin \theta$

Conversely, an image coordinate (u,v) is converted to a ray by first computing the angles ($\phi$, $\theta$) by:

$\phi = \text{sqrt}((u-u_c)^2 + (v-v_c)^2)$ $\theta = a \tan((v-v_c)/(u-u_c))$

A ray is computed by then rotating the view forward ray about the view up direction by $\phi$ and then rotating again by $\theta$ about the view forward direction. The resulting ray is then cast through volume in the similar manner to the usual volume rendering process. The preceding computations can be made more efficient by pre-computing the two angles ($\phi$, $\theta$) for the entire image or even the corresponding rotation matrices.

The present methods can be integrated as improvements to known systems and methods for performing 3D visualization, navigation and examination. Such systems and methods are described, for example, in U.S. Pat. No. 5,971,767 to Kaufman et al. entitled "System and Method for Performing a Virtual Examination," which is hereby incorporated by reference in its entirety. The present methods can be performed on any number of computer processing platforms, including personal computer systems. For example, an IBM compatible Wintel PC operating under the Windows2000 operating system and having a single 1 GHZ CPU is generally suitable for such applications.

Moving Cross-Sectional Marking

Figure 23:
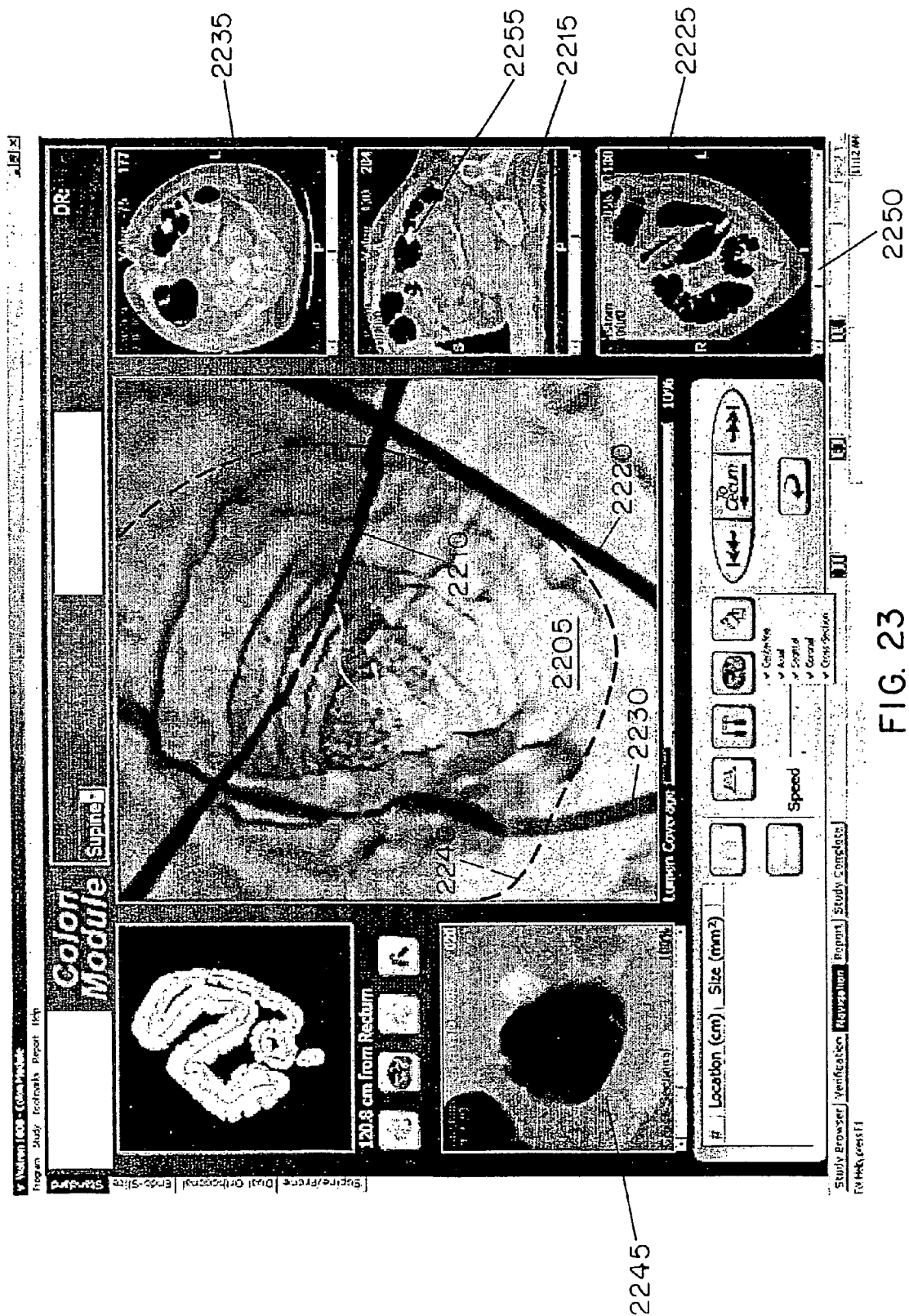
FIG. 23 is a pictorial representation of an exemplary user interface for a virtual examination system illustrating the use of moving cross section marking.

An additional improvement with respect to virtual navigation and examination is the ability to navigate in a 3D environment while being able to cross-reference the current navigation to one or more 2D images. Referring to FIG. 23, the present invention provides for the display of markers in a 3D environment and the concurrent display of one or more 2D images corresponding to the marker position. In the 3D display 2205 of a colon, slice marker 2210 corresponds to the sagital cross sectional image 2215, slice marker 2220 corresponds to the coronal cross sectional image 2225 and slice marker 2230 corresponds to the axial cross sectional image 2235. The axial, coronal and sagital images are reformatted 2D images which are aligned with the axes of the patient. In addition, slice marker 2240 corresponds to cross sectional image 2245 which is aligned perpendicularly to the centerline of the object. This view is referred to as a centerline-normal cross section.

As illustrated in FIG. 23, each reformatted cross sectional image has an associated scroll bar 2250. This provides a graphical user interface for positioning the respective marker to a region of interest in the 3D image, and vice versa, such that the 2D image and 3D image can synchronously display a selected region of interest. As the scroll bar, or other user interface, is moved, the 2D image changes to display the reformatted 2D image at the newly selected position. In addition, the marker in the 3D position is moved to reflect the selected cross sectional image which is being currently being displayed. Thus, visual coordination is achieved among disparate views and viewing modes.

In addition to the slice markers in the 3D image window, it is preferable if each cross sectional window has a navigation marker 2255 which corresponds to the current navigation position and viewing direction in the 3D object.

While in FIG. 23 four different cross sectional images, and associated slice markers, are shown, it is preferred that each of these images can be selected or deselected by the user. Generally, only one cross sectional image will be selected by a user during any given operation.

The slice markers 2210, 2220, 2230, 2240 are preferably displayed with a color or translucency which allows them to be differentiated in the 3D display without obscuring the content of the 3D image window. As the shape of a virtual object is perceived by variations in shading, it is preferable to display the slice markers by altering the chrominance values (color) of the voxels corresponding to the slice markers and not the luminance values of such voxels.

Coloration of the slice markers can be achieved by modifying the base voxel color within the volume rendering module. During volume rendering, the distance from each 2D slice plane of each visible voxel is computed. This is performed by direct computation of the plane equation for each voxel of each plane. The plane equation is expressed as:

$$Ax+By+Cz+D=\text{distance}$$

Where A,B,C and D are the plane equation coefficients which define the 2D slice location in three dimensions. The current voxel location is given by (x,y,z). Voxels precisely on the plane have a distance value equal to zero, while voxels at some distance from the plane have a non-zero value proportional to the distance from the plane, when the coefficients are pre-normalized. Thus, computing the plane equation for a voxel results in that voxel's distance from the plane. A voxel is considered part of the plane when the absolute value of the distance from the plane is less than a predetermined threshold value. If the voxel is considered within the plane, the base color will be modified during volume rendering.

Although the present invention has been described in connection with specific exemplary embodiments, it should be understood that various changes, substitutions and alterations can be made to the disclosed embodiments without departing from the spirit and scope of the invention as set forth in the appended claims.

The invention claimed is:

1. A method of electronically cleaning a virtual object comprising:
   using a computer or processor to perform the steps:
   defining a plurality of intensity value ranges representing corresponding material type classifications in the image data;
   identifying boundary regions between at least a portion of the material type classifications in the image data;
   defining at least one set of intersection conditions which correspond to expected intersection regions;
   casting segmentation rays from the boundary regions to detect regions which satisfy any of the at least one set of intersection conditions; and
   performing intersection region specific correction on the detected regions.

2. The method of claim 1, further comprising the step of volumetric contrast enhancement.

3. The method of claim 2, wherein the virtual object is a colon and wherein the plurality of material types include air, soft tissue, stool and fluid.

4. The method of claim 3, wherein the intersection regions include airsoft tissue, air-stool and air-fluid regions.

5. The method of claim 4, wherein upon detecting an air-soft tissue region, the intersection specific correction includes labeling at least a portion of the voxels of the ray as colon wall and labeling a portion of the voxels of the ray as mucosa.

6. The method of claim 5, wherein upon detecting an air-fluid region, the intersection specific correction includes labeling the voxels of the region as air voxels.

7. The method of claim 6, wherein upon detecting an air-soft tissue region, the intersection specific correction includes labeling at least a portion of the voxels of the ray as colon wall and labeling a portion of the voxels of the ray as mucous.

8. The method of claim 4, wherein upon detecting an air-stool region, the intersection specific correction includes reconstructing the voxels in the region by labeling at least a portion of the stool voxels as fluid voxels and labeling a portion of the voxels of the ray as mucosa.

9. The method of claim 1, wherein the step of identifying boundary regions further comprises:
   selecting a material type for segmentation;
   identifying seed voxels in the regions of the selected material type; and
   applying region growing from the seed voxels until a boundary between the selected material type and another material type is detected.

* * * * *